(12) United States Patent
Wu

(10) Patent No.: US 11,927,305 B2
(45) Date of Patent: Mar. 12, 2024

(54) DRIVE DEVICE

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 1242 days.

(21) Appl. No.: 16/317,727

(22) PCT Filed: Jun. 12, 2017

(86) PCT No.: PCT/EP2017/025165
§ 371 (c)(1),
(2) Date: Jan. 14, 2019

(87) PCT Pub. No.: WO2018/010847
PCT Pub. Date: Jan. 18, 2018

(65) Prior Publication Data
US 2019/0293234 A1    Sep. 26, 2019

(30) Foreign Application Priority Data

Jul. 12, 2016  (DE) .................. 10 2016 008 377.8

(51) Int. Cl.
*F16N 25/00* (2006.01)
*F01M 1/02* (2006.01)
(Continued)

(52) U.S. Cl.
CPC .............. *F16N 25/00* (2013.01); *F01M 1/02* (2013.01); *F16H 57/0436* (2013.01); *F16N 7/38* (2013.01);
(Continued)

(58) Field of Classification Search
CPC ........... F16N 25/00; F16N 25/04; F16H 57/04
(Continued)

(56) References Cited

U.S. PATENT DOCUMENTS 2,499,571 A * 3/1950 Davis ...................... F16N 25/00
184/7.3
2,930,402 A * 3/1960 Gamet .................... F15B 21/00
137/565.19
(Continued)

FOREIGN PATENT DOCUMENTS

CN         2570596 Y      9/2003
CN       201561258 U      8/2010
(Continued)

OTHER PUBLICATIONS

CN201561258—WIPO translation (Year: 2010).*
(Continued)

*Primary Examiner* — Michael R Mansen
*Assistant Examiner* — Mark K Buse
(74) *Attorney, Agent, or Firm* — CARTER, DELUCA & FARRELL LLP

(57) ABSTRACT

A drive device includes a gear unit, which is able to be driven by a motor and includes a pressure-lubrication system. The pressure-lubrication system has a distributor block, having a continuous longitudinal bore and continuous transverse bores. The distributor block is arranged as a single piece, in particular from metal such as steel or aluminum.

4 Claims, 7 Drawing Sheets

(51) Int. Cl.
*F16H 57/04* (2010.01)
*F16N 7/38* (2006.01)
*F16N 39/06* (2006.01)
*F16N 13/06* (2006.01)
*F16N 39/02* (2006.01)

(52) U.S. Cl.
CPC ..... *F16N 39/06* (2013.01); *F01M 2001/0253* (2013.01); *F16H 57/0404* (2013.01); *F16N 2013/063* (2013.01); *F16N 39/02* (2013.01); *F16N 2210/12* (2013.01); *F16N 2250/04* (2013.01); *F16N 2250/08* (2013.01); *F16N 2280/00* (2013.01)

(58) Field of Classification Search
USPC ....................................................... 184/6.12
See application file for complete search history.

(56) References Cited

U.S. PATENT DOCUMENTS

| | | | | |
|---|---|---|---|---|
| 3,107,553 | A * | 10/1963 | Tuck | F16H 47/085 475/54 |
| 5,010,767 | A * | 4/1991 | Divisi | F16N 27/00 73/253 |
| 5,099,715 | A * | 3/1992 | Baiker | F16H 57/0413 184/6.12 |
| 5,921,349 | A * | 7/1999 | Sato | F16N 7/32 184/6.14 |
| 2003/0089553 | A1 * | 5/2003 | Conley | F16N 25/02 184/7.4 |
| 2004/0035641 | A1 * | 2/2004 | Conley | F16N 27/00 184/7.4 |
| 2004/0040790 | A1 * | 3/2004 | Conley | F16N 27/00 184/14 |
| 2007/0261922 | A1 * | 11/2007 | Mullen | F16H 57/045 184/6.12 |
| 2012/0181114 | A1 * | 7/2012 | Paluncic | F16N 25/00 184/6.28 |
| 2015/0129362 | A1 * | 5/2015 | Clark | F16N 21/04 184/7.4 |
| 2015/0219276 | A1 * | 8/2015 | Roys | F16N 25/00 137/565.13 |

FOREIGN PATENT DOCUMENTS

| | | |
|---|---|---|
| CN | 201611000 U | 10/2010 |
| JP | 2012052649 A | 3/2012 |
| KR | 101027536 B1 | 4/2011 |
| WO | WO 2003042595 A1 | 5/2003 |

OTHER PUBLICATIONS

International Search Report dated Oct. 16, 2017, in International Application No. PCT/EP2017/025165 (English-language translation).

\* cited by examiner

DRIVE DEVICE

FIELD OF THE INVENTION

The present invention relates to a drive device.

BACKGROUND INFORMATION

Drive devices generally may generate waste heat.

SUMMARY

Example embodiments of the present invention provide a drive device for which the simplest production is to be achieved.

According to example embodiments of the present invention, a drive device includes a gear unit, which is able to be driven by a motor and has a pressure-lubrication system, the pressure-lubrication system having a distributor block, the distributor block having a continuous longitudinal bore and continuous transverse bores, the distributor block being produced as a single piece, in particular from metal such as steel or aluminum.

This offers the advantage that a simple production is possible as a result of the single-piece configuration of the distributor block. In addition, high tightness is achievable in this manner. This is because a configuration using multiple pieces would require the provision of appropriate seals. According to example embodiments of the present invention, however, only a number of bores have to be implemented in the distributor block.

In example embodiments, an oil pump, in particular an oil pump driven by an electric motor, supplies oil from the oil sump of the gear unit into a first opening of the longitudinal bore, in particular with the aid of a conduit. This is considered advantageous inasmuch as a motor-powered oil delivery is provided.

In example embodiments, an oil conduit leads from a first transverse bore to the interior of the gear unit, the first transverse bore having a larger cross-section than any of the other transverse bores. This has the advantage that oil that has flowed into the longitudinal bore must be distributed into the transverse bore. In this distribution, a valve may be provided by which the oil flow is able to be controlled.

In example embodiments, a valve for interrupting the oil flow from the longitudinal bore to the first transverse bore is arranged in the distributor block, in particular inside the longitudinal bore. This offers the advantage that the distribution of the oil from the longitudinal bore into the transverse bore is able to be controlled with the aid of a valve.

In example embodiments, the longitudinal bore has a constriction. This is considered advantageous insofar as it allows for the placement of a valve in that a movably disposed ball is able to be pressed against the constriction or pressed away from the constriction. Depending on the position of the ball, the oil flow is either hampered or not hampered.

In example embodiments, the longitudinal bore includes a first region in which the cross-section is smaller than in two regions that abut the first region and that are set apart from each other by the first region, the longitudinal bore in particular being implemented as a stepped bore. This offers the advantage that a constriction is easily able to be produced by initially implementing the longitudinal bore as a stepped bore, i.e. by longitudinally implementing a first continuous bore, whereupon a blind-hole bore, i.e. a bore that is not continuous, having a greater bore diameter is implemented in parallel and centrally with respect to the first bore from both sides of the outlet of the first bore in the direction of the environment. As a result, the longitudinal bore including the constriction is able to be produced by three drilling processes.

In example embodiments, one sensor or a plurality of sensors is provided in the further transverse bores, in particular a temperature sensor, a pressure sensor, a pressure-dependent switch or a temperature-dependent switch being positioned as a sensor. This has the advantage that a tight connection of the sensors is able to be carried out since the distributor block is produced as a single piece. In addition, different sensors may be mounted on the distributor block, in particular on the respective outlet opening of the respective transverse bore. The pressure or temperature is therefore easily acquirable.

In example embodiments, a filter is connected to the distributor block. This has the advantage that the oil distributed by the distributor block is able to be filtered.

In example embodiments, threaded bores are introduced into the distributor block, in particular for the attachment of sensors and/or connection parts for the conduit. This is considered advantageous insofar as a simple and sturdy attachment is able to be provided.

A respective bore pattern is implementable in square form, in particular such that the center point of the bore pattern is disposed in the center of the bore.

In example embodiments, the valve has a ball which is connected to a restoring element, the restoring element in particular being a spring element, which is connected to the distributor block by a first end region and connected to the ball via an end region that is set apart from the first end region. This offers the advantage of allowing for a rapid and simple production.

Further features and aspects of example embodiments of the present invention are described in greater detail below with reference to the appended Figures.

DETAILED DESCRIPTION

Figure 1:
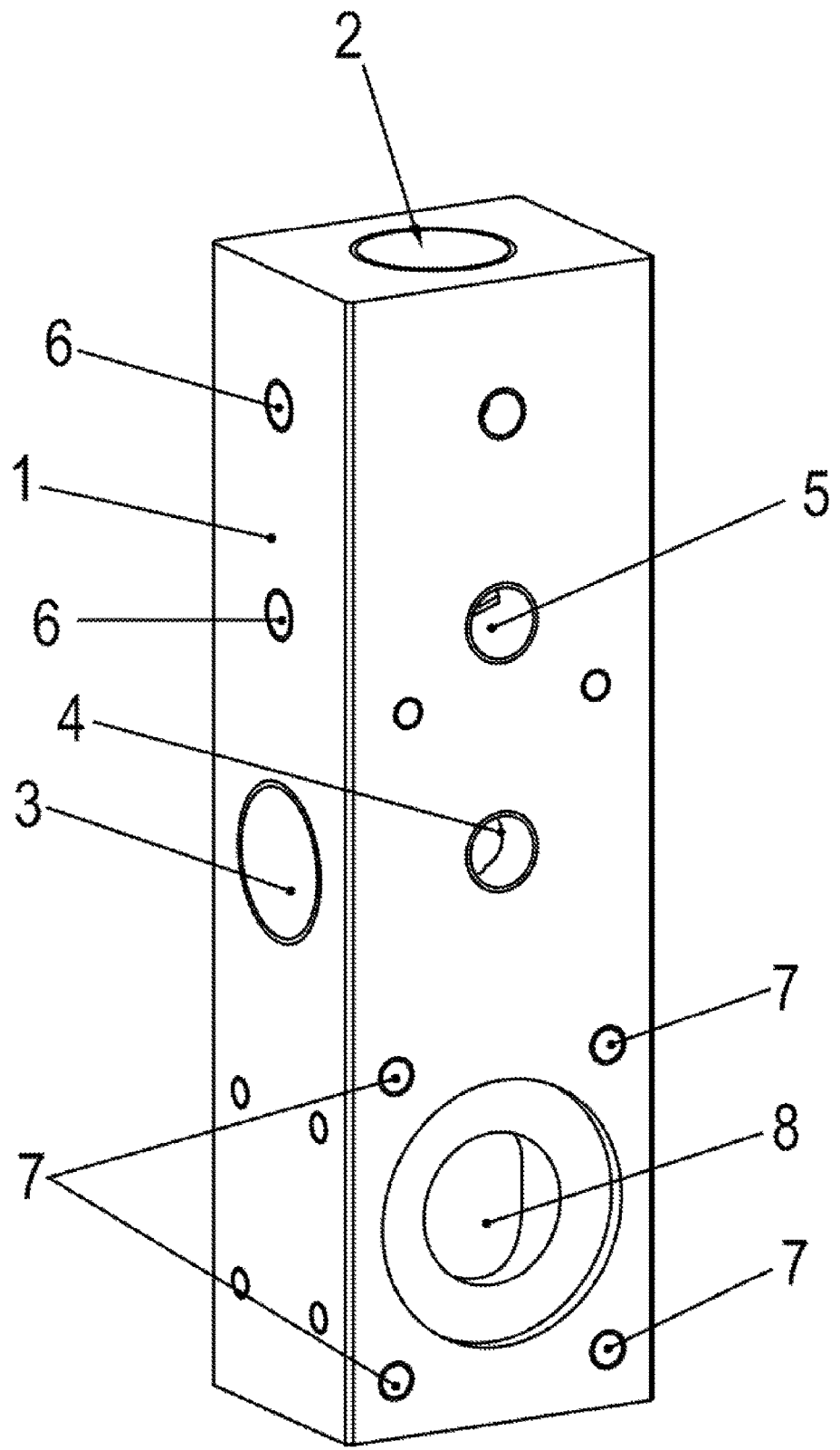
FIG. 1 is a perspective view of a distributor block 1 a pressure-lubrication system according to an example embodiment of the present invention for a gear unit 38.
Figure 2:
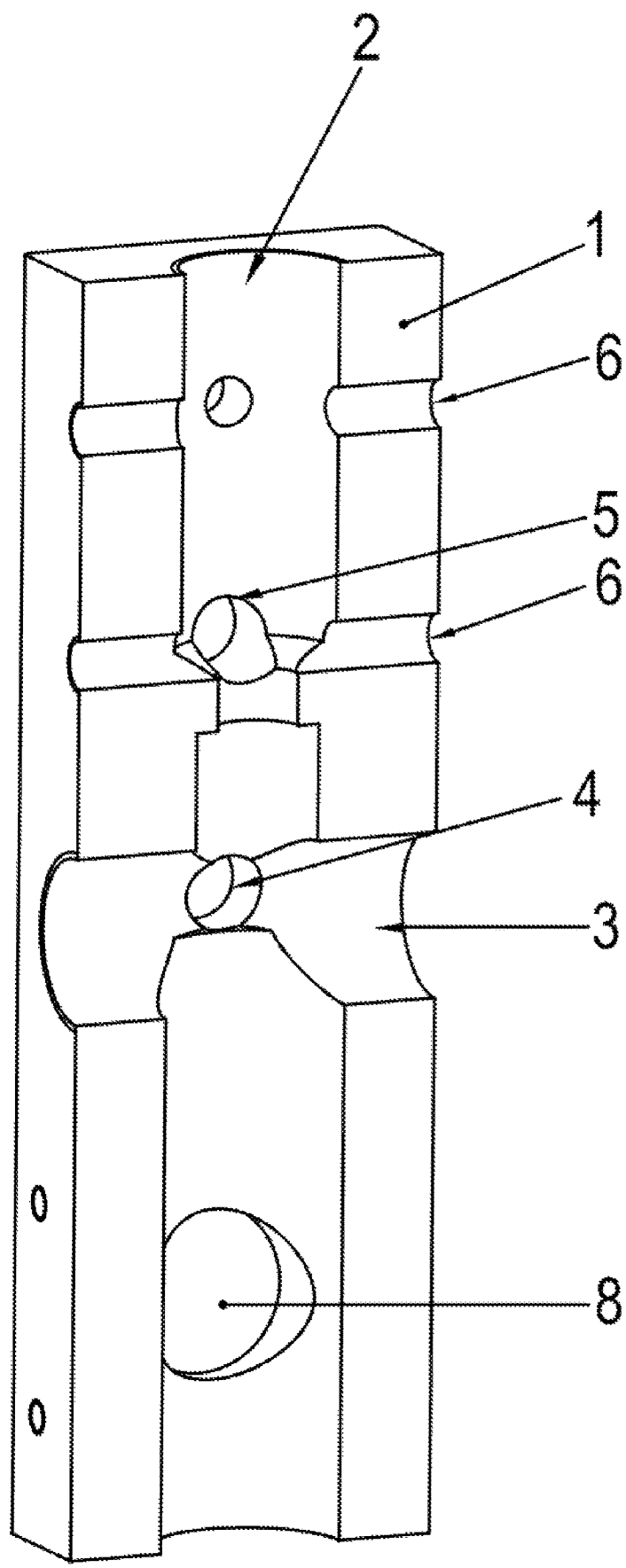
FIG. 2 is a cross-sectional perspective view of a distributor block 1.

As illustrated in FIGS. 1 and 2, distributor block 1 has a longitudinal bore 2 which is continuous in the direction of the longest extension of distributor block 1.

This longitudinal bore has a constriction 41 in a central region of distributor block 1.

Upstream and downstream from the constriction, distributor block 1 has transverse bores (3, 4, 5, 6).

At a greater distance from the constriction, distributor block 1 also has a further transverse bore 8.

Distributor block 1 includes threaded bores 7, which, for example, are disposed in a square bore pattern, for the attachment of further devices, the bore axis of the respective transverse bore being disposed at a centrical alignment through the bore pattern.

The devices are therefore connectable to the distributor block in each case, in particular with the aid of screws.

A valve, for instance, may be positioned at the constriction, and a ball by which the continuous longitudinal bore is able to be sealed at its constriction is attached to a restoring element, which is connectable to distributor block 1 with the aid of a friction-locked connection or a keyed connection.

A valve behavior is therefore easily achievable. In a first flow direction of the coolant, ball 30 is pressed against the constriction, and in the other flow direction, ball 30 is pressed away from the constriction. The threshold values for the pressure difference are taken into account with the aid of restoring element A5.

Figure 3:
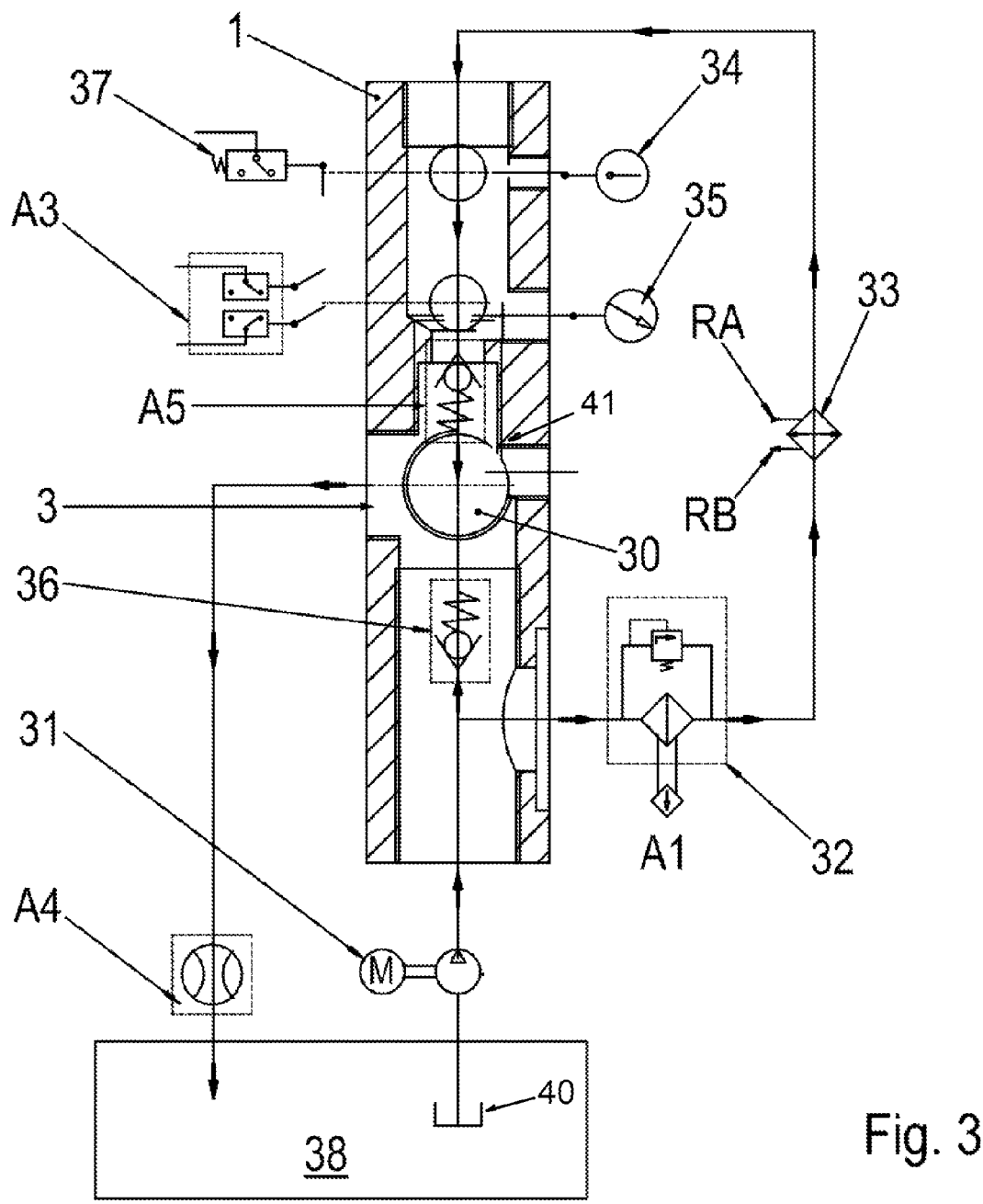
FIG. 3 schematically illustrates the pressure-lubrication system for gear unit 38.
Figure 4:
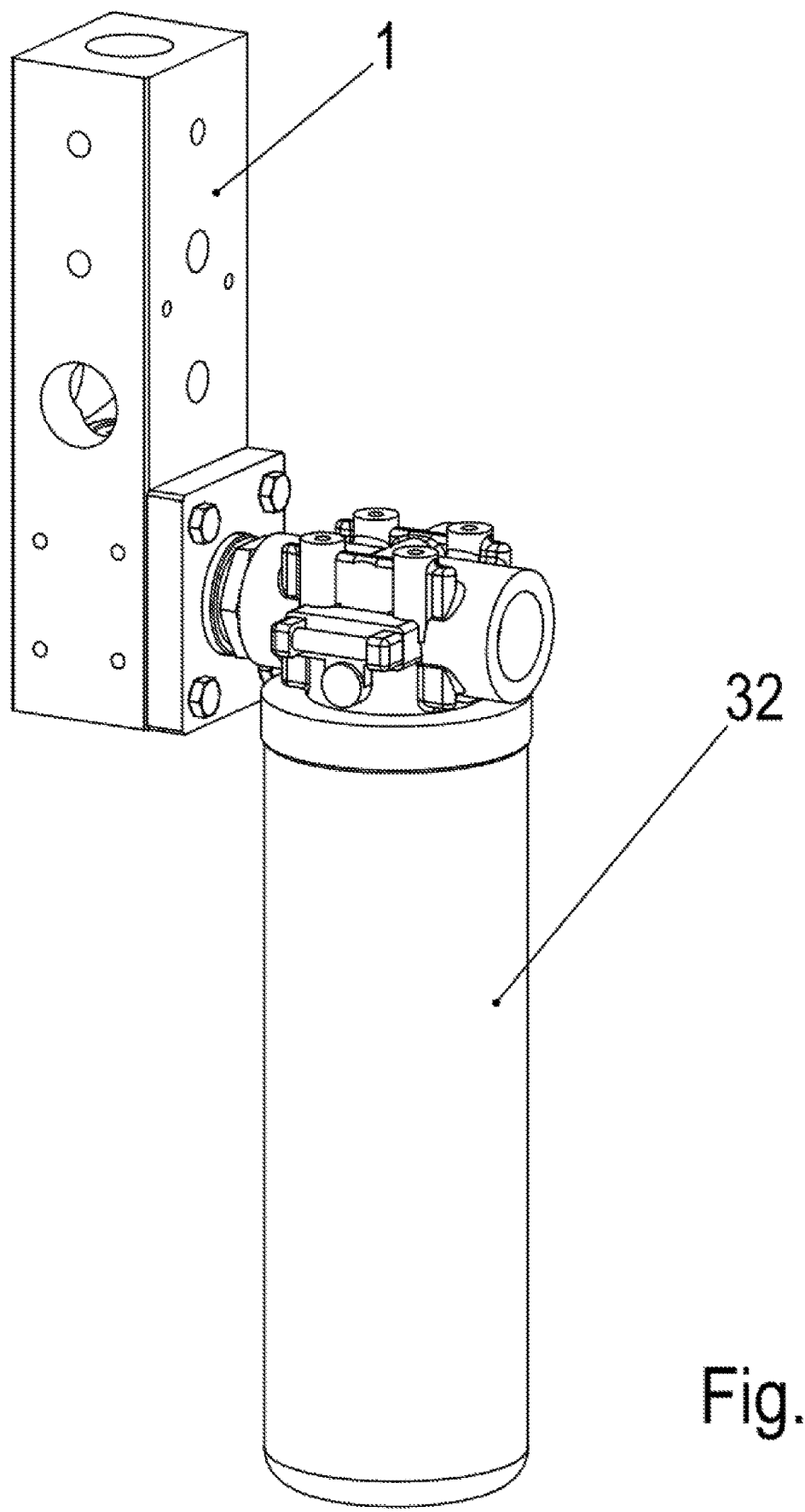
FIG. 4 illustrates a filter 32, which is mounted on distributor block 1.
Figure 5:
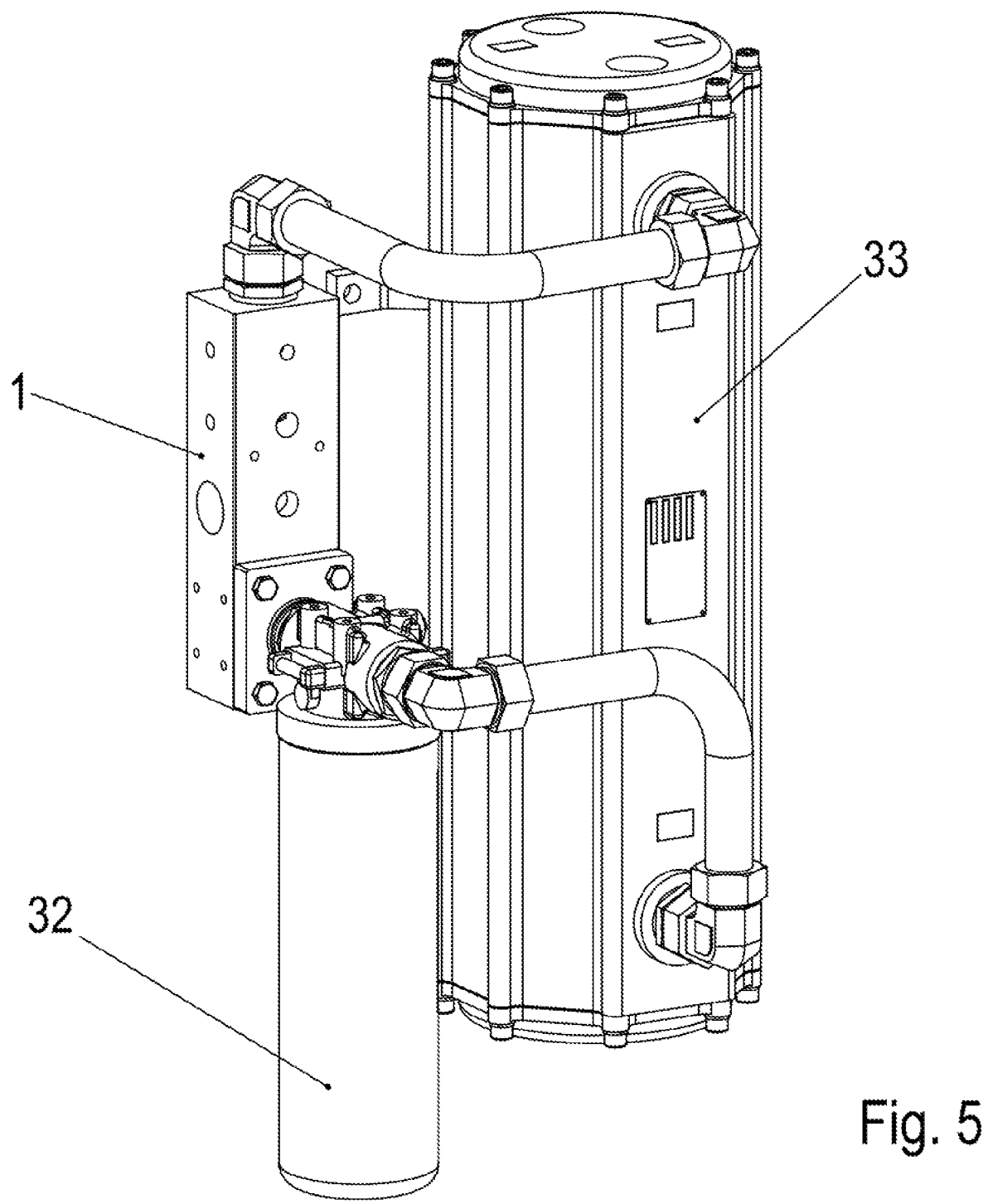
FIG. 5, in contrast to FIG. 4, illustrates a cooling element 33 additionally connected to distributor block 1.
Figure 6:
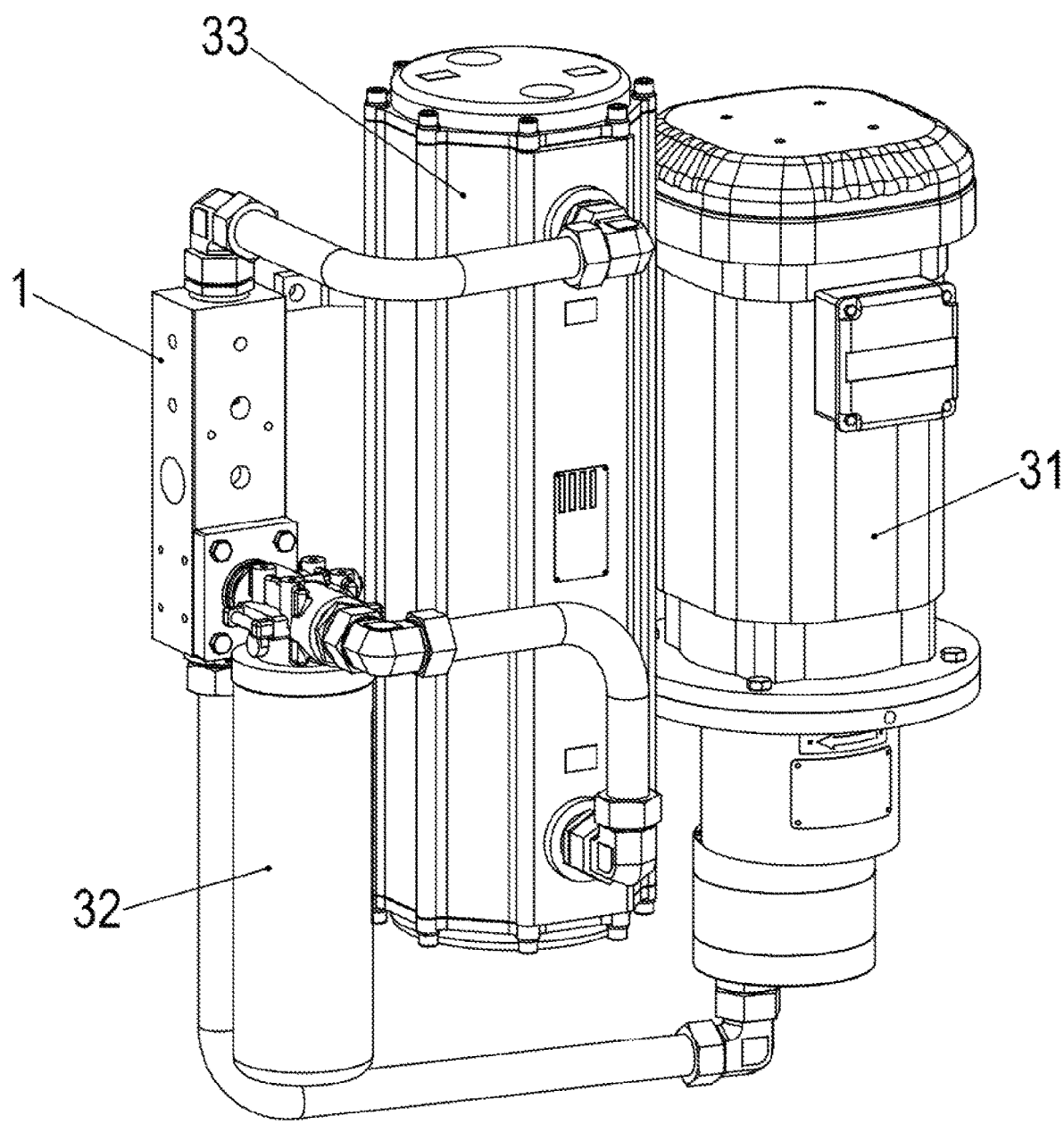
FIG. 6, in contrast to FIG. 5, illustrates a motor pump 31 additionally connected to distributor block 1.
Figure 7:
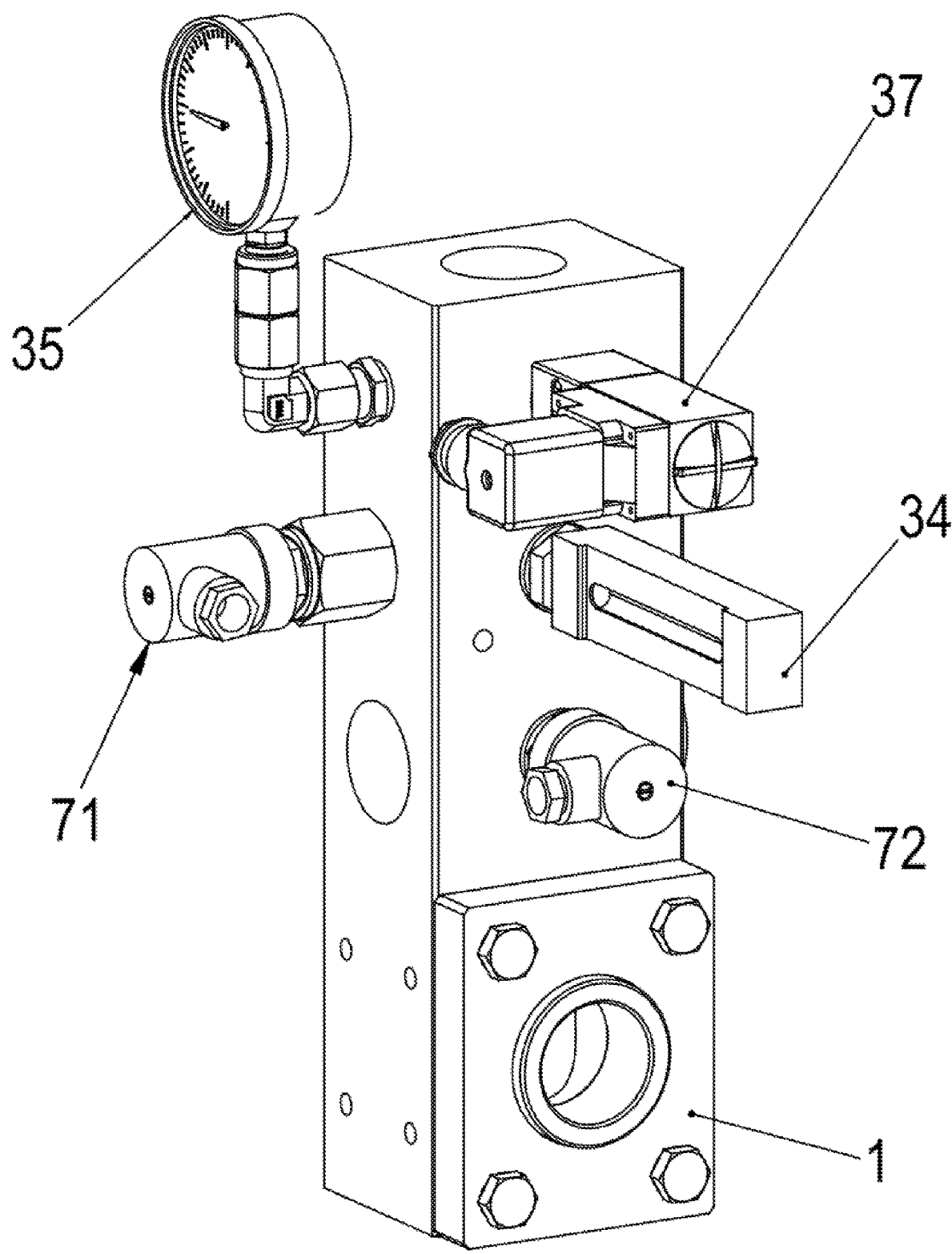
FIG. 7 is a perspective view of the distributor block together with connected sensors.

As is furthermore illustrated in FIG. 3, a motor pump 31 drives the coolant circuit. In the process, the oil aspirated and/or supplied from the oil sump 40 of the gear unit is conveyed into longitudinal bore 2 of distributor block 1, a first share of the oil being supplied to a valve 36 and a further share being supplied via a filter 32 having a contamination display A1 to a cooling element 33, in particular a fluid-cooling element.

A water inlet RA and a water outlet RB are also situated on cooling element 33. The oil conveyed through cooling element 33 is supplied to longitudinal bore 2 at the other opening of longitudinal bore 2.

The transverse bores (3, 4, 5, 6, 8) penetrate longitudinal bore 2 and thereby induce a distribution of oil.

Coming from distributor block 1, the oil is guided out via transverse bore 3, which has the largest cross-section among the transverse bores (3, 4, 5, 6, 8), and conveyed to the gear unit with the aid of the oil conduit.

Situated in the other transverse bores (4, 5, 6, 8) in each case is a sensor, such as temperature sensor 34 or pressure sensor 35, or a switch such as a pressure-dependent switch 37, temperature switch 71, in particular a temperature-dependent switch, or temperature switch 72, in particular a temperature-dependent switch. A display A3 is provided on temperature sensor 34, and a display A4 on the flow sensor.

LIST OF REFERENCE CHARACTERS 1 distributor block
2 longitudinal bore
3 transverse bore
4 transverse bore
5 transverse bore
6 transverse bore
7 threaded bore
8 transverse-bore bore
30 ball of the valve
31 motor pump
32 filter
33 cooling element, in particular fluid-cooling element
34 temperature sensor
35 pressure sensor
36 valve
37 pressure-dependent switch
38 gear unit
40 oil sump
41 constriction
71 temperature switch, in particular temperature-dependent switch
72 temperature switch, in particular temperature-dependent switch
A1 contamination display for filter 32
A3 temperature sensor including display
A4 flow sensor including display
A5 valve
RA water inlet
RB water outlet

The invention claimed is:

1. A drive device, comprising:
a gear unit, drivable by a motor, including a pressure-lubrication system, the pressure-lubrication system having a distributor block, the distributor block including a continuous longitudinal bore and continuous transverse bores, the distributor block being arranged as a single piece;
wherein an oil conduit leads from a first transverse bore to an interior of the gear unit, the first transverse bore having a larger cross-section than all other transverse bores;
the drive device further comprising a valve provided in the distributor block and adapted to prevent an oil flow from the longitudinal bore to the first transverse bore.

2. The drive device according to claim 1, wherein the valve is arranged inside the longitudinal bore.

3. The drive device according to claim 1, wherein the valve includes a ball connected to a restoring element.

4. The drive device according to claim 3, wherein the restoring element includes a spring connected by a first end region to the distributor block and is connected to the ball by an end region that is set apart from the first end region.

\* \* \* \* \*